United States Patent Office 3,514,451
Patented May 26, 1970

3,514,451
NOVEL 2-SUBSTITUTED 5-NITROFURANS AND A PROCESS FOR THE PREPARATION THEREOF
Kurt T. J. Skagius and Eva B. Akerblom, Uppsala, Sweden, assignors to Pharmacia AB, Uppsala, Sweden, a company of Sweden
No Drawing. Filed Feb. 10, 1967, Ser. No. 615,086
Claims priority, application Sweden, Feb. 14, 1966, 1,830/66
Int. Cl. C07d *91/16, 91/26, 49/30*
U.S. Cl. 260—240        16 Claims

ABSTRACT OF THE DISCLOSURE

Novel compounds represented by the Formula I

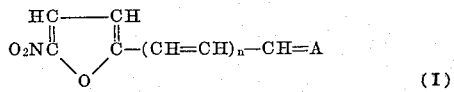

(I)

wherein:

$n$ is zero to one;
A is either a radical having the formula

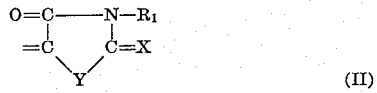

(II)

or a radical having the formula

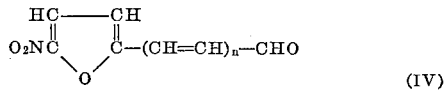

(III)

wherein:

$R_1$ and $R_2$ each represent either an alkyl, containing from 1 to 3 inclusive carbon atoms, or allyl;
X represents either oxygen, sulfur or the radical —$NR_4$, wherein $R_4$ is either hydrogen or an alkyl, containing from 1 to 3 inclusive carbon atoms; and
Y represents either sulfur or the radical —$NR_3$, wherein $R_3$ represents an alkyl containing from 1 to 3 carbon atoms, and therapeutically acceptable salts thereof. The compounds are valuable medicinal agents.

---

This invention relates to novel 2-substituted 5-nitrofurans and a process for the preparation thereof.

More particularly the invention is concerned with novel compounds represented by the Formula I

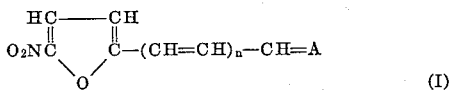

(I)

wherein:

$n$ represents a number from zero to one;
A represents a member selected from the group consisting of radicals having the formula

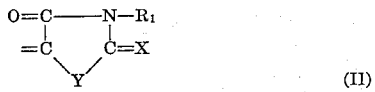

(II)

and

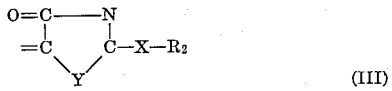

(III)

wherein:

$R_1$ and $R_2$ represent each a member selected from the group consisting of alkyl, containing from 1 to 3 inclusive carbon atoms, and allyl;
X represents a member selected from the group consisting of oxygen, sulfur and the radical —$NR_4$, wherein $R_4$ is a member selected from the group consisting of hydrogen and alkyl, containing from 1 to 3 inclusive carbon atoms; and
Y represents a member selected from the group consisting of sulfur and the radical —$NR_3$, wherein $R_3$ represents alkyl, containing from 1 to 3 inclusive carbon atoms, and therapeutically acceptable salts thereof.

The novel compounds and their salts are valuable medicinal agents presenting an effect upon micro-organisms, whilst at the same time they are satisfactorily acceptable therapeutically. The new compounds present particularly good antibacterial and antimycotic properties. The following compounds have been tested with respect to these properties:

(A) 2 - methylamino-5-(5-nitro-2-furfurylidene)-thiazoline-4-one.
(B) 3 - methyl - 2-imino-5-(5-nitro-2-furfurylidene)-thiazolidine-4-one.
(C) 3 - methyl - 2 - methylimino-5-(5-nitro-2-furfurylidene)-thiazolidine-4-one.
(D) 3 - allyl - 5-(nitro-2-furfurylidene)-thiazolidine-2,4-dione.
(E) 2-dimethylamino-5-(5-nitro-2-furfurylidene)-thiazoline-4-one.
(F) 3 - methyl - 5-(5-nitro-2-furfurylidene)-2-thioxo-thiazolidine-4-one.
(G) 1,3 - dimethyl-5-(5-nitro-2-furfurylidene)-2-thioxo-imidazolidine-4-one.

The following table shows antimicrobial effect ($\mu$g./ml.) in vitro for the above compounds A–G. The activity is determined according to the so-called pipe dilution method.

TABLE

| Compound | E. coli | Staph. aur. | Tb 354 | B-haem. streptccock | Candida albicans | Trichophyton III | Trichophyton mentagraphytes |
|---|---|---|---|---|---|---|---|
| A | 0.4 | 0.8 | | 1.6 | 6.3 | 12.5 | 25 |
| B | 0.8 | 0.8 | 0.8 | 25 | 0.8 | 0.8 | 1.6 |
| C | 3.2 | 1.6 | 0.8 | 50 | 0.8 | 1.6 | 3.2 |
| D | 12.5 | 0.8 | 6.3 | 12.5 | 0.8 | 0.8 | 0.8 |
| E | 0.4 | 0.4 | | 0.8 | 3.2 | 6.3 | 50 |
| F | 100 | 0.4 | | 50 | 0.8 | 0.4 | 0.4 |
| G | 1.6 | 0.4 | | 100 | 12.5 | 0.8 | 3.2 |

The invention also concerns a method for the preparation of compounds having Formula I above. According to this method, a compound of the Formula IV

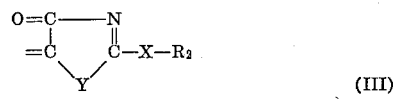

(IV)

wherein $n$ has the above significance, is caused to react with a member selected from the group consisting of compounds of the formula $H_2$=A and reactive derivatives thereof, wherein A has the above significance, at a temperature in the range of from 20 to 120° C. in the presence of a solvent.

The diacetate and acetals are particularly mentioned as reactive derivatives of the compounds having the Formula IV. The above reaction can be considered to be a condensation. It proceeds more rapidly if the reaction components are heated. Suitable reaction temperatures are between 20 and 120° C., preferably between 60 and 90° C. It is expedient to effect the reaction in the presence of solvents and/or an acid or weak basic catalyst. Examples of suitable condensation media are benzene and bortrifluoridetherate, acetic acid and sodium acetate, acetic anhydride and sodium acetate.

The compounds of the above Formulae I–III, wherein X represents oxygen, can be prepared from corresponding compounds wherein X represents $NR_3$, wherein $R_3$ stands for alkyl, containing from 1 to 3 inclusive carbon atoms, by treatment with hydrolyzing media.

Compounds of the general Formula I, wherein $n$ is zero, Y sulfur and X is the radical $NR_3$ can be prepared by reacting a compound having the general Formula V $$\underset{O_2N}{\overset{HC\text{———}CH}{\underset{O}{\diagdown\;\;\;\diagup}}}C\text{—}C\equiv C\text{—}COOR \quad (V)$$

wherein R is a lower alkyl group, with a compound having the general Formula VI $$R_4\text{—}NH\text{—}\underset{\underset{S}{\|}}{C}\text{—}N\diagup^{R_3}_{\diagdown R_5} \quad (VI)$$

wherein one of the radicals $R_4$ and $R_5$ represents hydrogen and the other radical represents alkyl, containing from 1 to 3 carbon atoms, or allyl.

The invention will now be described by the following examples.

EXAMPLE 1

3-ethyl-2-ethylimino-5-(5-nitro-2-furfurylidene)-thiazolidine-4-one

To 33.4 g. of 2-ethylimino-3-ethyl-thiazolidene-4-one were added 26.8 g. of 5-nitro-2-furfural, 47.5 g. of sodium acetate and 400 ml. of concentrated acetic acid in a flask. The mixture was heated for 1½ hours at 60° C. and then cooled. Undissolved substance was removed by filtration, washed with water and recrystallized from ethanol. 53 g. (95%) of a yellow substance having a melting point of 146–152° C. were obtained.

*Analysis.*—Calcd. (percent): C, 48.8; H, 4.4; N, 14.2; S, 10.9. Found (percent): C, 48.9; H, 4.5; N, 14.3; S, 11.1.

EXAMPLE 2

3-methyl-5-(5-nitro-2-furfurylidene)-2-thioxo-thiazolidine-4-one

To 15 g. of methylrhodamine were added 14.4 g. of 5-nitro-2-furfural, 26.1 g. of sodium acetate and 123 ml. of concentrated acetic acid. The mixture was heated for one and a half hours at 60° C. and then cooled. Undissolved substance was removed by filtering, washed with water and recrystallized from a mixture of dimethylformamide and ethanol. 23.3 g. (86%) of a red substance having a melting point of 188–190° C. were obtained.

*Analysis.*—Calcd. (percent): C, 40.0; H, 2.2; N, 10.4; S, 23.8. Found (percent): C, 40.0; H, —; N, 10.7; S, 23.5.

EXAMPLE 3

2-methylamino-5-(5-nitro-2-furfurylidene)-thiazoline-4-one

To 19.5 g. (0.15 mol) of 2-methylaminothiazoline-4-one were added 21.2 g. (0.15 mol) of 5-nitro-2-furfural, 23 g. of sodium acetate and 250 ml. of acetic anhydride. The mixture was heated for 2.5 hours at 80° C. After cooling the undissolved substance was removed by filtering and thoroughly washed with water.

The filtered substance was refluxed in 750 ml. of concentrated acetic acid. After cooling, undissolved substance was removed by suction and recrystallized from dimethyl formamide. 33 g. of a yellow substance were obtained which had a melting point of 313–313.5° C. (decomposition).

*Analysis.*—Calcd. (percent): C, 42.7; H, 2.8; N, 16.6; S, 12.7. Found (percent): C, 43.0; H, 3.2; N, 16.4; S, 12.4.

EXAMPLE 4

3-methyl-5-(5-nitro-2-furfurylidene)-thiazolidene-2,4-dione 4 g. of 3-methyl-2-methylamino-5-(5-nitro-2-furfurylidine)-thiazolidine-4-one were boiled in 50 ml. of aqueous 2 M hydrochloric acid for 23 hours. Undissolved substance was removed by filtration and recrystallized from a mixture of dimethyl formamide and ethanol. 2.3 g. of a yellow substance having a melting point of 209–212° C. were obtained.

*Analysis.*—Calcd. (percent): C, 42.5; H, 2.4; N, 11.0; S, 12.6. Found (percent): C, 42.6; H, 2.4; N, 11.0; S, 12.5.

The following compounds have also been prepared by applying the aforementioned methods:

3-ethyl-2-imino-5-(5-nitro-2-furfurylidine)-thiazolidine-4-one; melting point 199–201° C.

*Analysis.*—Calcd. (percent): C, 44.9; H, 3.4; N, 15.5; S, 12.0. Found (percent): C, 45.0; H, 3.6; N, 15.9; S, 12.0.

3-methyl-2-methylimino-5-(5-nitro-2-furfurylidene)-thiazolidine-4-one; melting point 241–242° C.

*Analysis.*—Calcd. (percent): C, 44.9; H, 3.4; N, 15.7; S, 12.0. Found (percent): C, 45.0; H, 3.4; N, 15.8; S, 12.3.

3-n-propyl-2-n-propylimino-5-(5-nitro-2-furfurylidene)-thiazolidine-4-one; melting point 100–102° C.

*Analysis.*—Calcd. (percent): C, 52.0; H, 5.3; N, 13.0; S, 9.9. Found (percent): C, 52.0; H, 5.3; N, 12.0; S, 10.1.

3-isopropyl-2-isopropylimino - 5 - (5 - nitro - 2 - furfurylidene)-thiazolidine-4-one; melting point 134–136° C.

*Analysis.*—Calcd. (percent): C, 52.0; H, 5.3; N, 13.0; S, 9.9. Found (percent): C, 51.8; H, 5.3; N, 12.9; S, 10.0.

3-allyl-2-allylimino-5-(5-nitro - 2 - furfurylidene) - thiazolidine-4-one; melting point 126.5–127.5° C.

*Analysis.*—Calcd. (percent): C, 52.6; H, 4.1; N, 13.2; S, 10.1. Found (percent): C, 52.4; H, 4.2; N, 13.1; S, 10.5.

3-ethyl-5-(5-nitro-2-furfurylidene) - thiazolidine - 2,4 - dione; melting point 135–136.5° C.

*Analysis.*—Calcd. (percent): C, 44.8; H, 3.0; N, 10.4; S, 12.0. Found (percent): C, 44.8; H, 3.2; N, 10.4; S, 12.0.

3-allyl-5-(5-nitro - 2 - furfurylidene) - thiazolidine-2,4-dione; melting point 138.5–140° C.

*Analysis.*—Calcd. (percent): C, 47.1; H, 2.9; N, 10.0; S, 11.5. Found (percent): C, 47.0; H, 3.1; N, 10.0; S, 11.3.

2-dimethylamino-5-(5-nitro - 2 - furfurylidene)-thiazoline-4-one; melting point 263–267° C.

*Analysis.*—Calcd. (percent): C, 44.9; H, 3.4; N, 15.7; S, 12.0. Found (percent): C, 45.0; H, 3.6; N, 15.8; S, 11.9.

1,3-dimethyl-5-(5-nitro-2-furfurylidene) - 2 - thioxo-imidazolidine-4-one; melting point 189.5–192.5° C.

*Analysis.*—Calcd. (percent): C, 44.9; H, 3.4; N, 15.7; S, 12.0. Found (percent): C, 45.1; H, 3.6; N, 15.5; S, 12.0.

3-ethyl-1-methyl-5-(5 - nitro - 2 - furfurylidene)-2-thioxo-imidazolidine-4-one; melting point 156–160° C.

*Analysis.*—Calcd. (percent): C, 46.9; H, 3.9; N, 14.9; S, 11.4. Found (percent): C, 47.0; H, 3.9; N, 14.8; S, 11.3.

3-methyl-2-isopropyl-5-(5 - nitro - 2 - furfurylidene)-2-thioxo-imidazolidine-4-one; melting point 136.5'164° C.

*Analysis.*—Calcd. (percent): C, 48.8; H, 4.4; N, 14.2; S, 10.9. Found (percent): C, 49.0; H, 4.6; N, 14.2; S, 10.8.

3-methyl-5-[3-(5 - nitro - 2 - furyl)-2-propene-1-ylidene]-thiazolidine-2,4-dione; melting point 228–229° C.

*Analysis.*—Calcd. (percent): C, 47.1; H, 2.9; N, 10.0; S, 11.5. Found (percent): C, 47.2; H, 3.0; N, 9.8; S, 11.2.

EXAMPLE 5

3-methyl-2-amino-5-(5-nitro-2-furfurylidene)-thiazolidine-4-one 4.2 g. (0.02 mol) of the ethyl ester of 5-nitro-2-furyl-propiolic acid are dissolved in 30 ml. of acetone and 1.8 g. (0.02 mole) of N-methylthiourea are added to the solution. The mixture is boiled for 2.5 hours and filtered upon cooling subjected to filtration. There are recovered 1.9 g. of a yellow substance. It is recrystallized from ethanol and dimethylformamide. Melting point 243–246° C. (decomposition).

*Analysis.*—Calcd. (percent): C, 42.66; H, 2.79; N, 16.59; S, 12.68. Found (percent): C, 42.70; H, 2.93; N, 16.51; S, 12.40.

What we claim is:

1. A compound represented by the Formula I

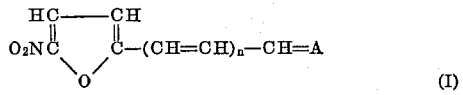

or a therapeutically acceptable salt thereof, wherein:

$n$ represents a number from zero to one;

A represents a member selected from the group consisting of radicals having the formula

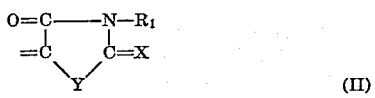

and

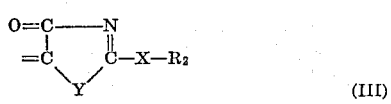

wherein:

$R_1$ and $R_2$ represent each a member selected from the group consisting of alkyl, containing from 1 to 3 inclusive carbon atoms, and allyl;

X represents a member selected from the group consisting of oxygen, sulfur and the radical —$NR_4$, wherein $R_4$ is a member selected from the group consisting of hydrogen and alkyl, containing from 1 to 3 inclusive carbon atoms; and Y represents a member selected from the group consisting of sulfur and the radical —$NR_3$, wherein $R_3$ represents alkyl, containing from 1 to 3 inclusive carbon atoms.

2. 2-methylamino-5-(nitro - 2 - furfurylidene)-thiazoline-4-one.

3. 3-methyl-2-imino-5-(5-nitro - 2 - furfurylidene) - thiazolidine-4-one.

4. 3-methyl-2-methylamino-5-(5-nitro-2-furfurylidene)-thiazolidine-4-one.

5. 3-allyl-5-(5-nitro-2-furfurylidene) - thiazolidine-2,4-dione.

6. 2-dimethylamino-5-(5-nitro - 2 - furfurylidene) - thiazoline-4-one.

7. 1,3-dimethyl-5-(5-nitro - 2 - furfurylidene)-2-thioxo-imidazolidine-4-one.

8. The compound according to claim 1 which is a therapeutically acceptable salt of Formula I.

9. A therapeutically acceptable salt of the compound as claimed in claim 2.

10. A therapeutically acceptable salt of the compound as claimed in claim 3.

11. A therapeutically acceptable salt of the compound as claimed in claim 4.

12. A therapeutically acceptable salt of the compound as claimed in claim 5.

13. A therapeutically acceptable salt of the compound as claimed in claim 6.

14. A therapeutically acceptable salt of the compound as claimed in claim 7.

15. 3-methyl-5-(5-nitro - 2 - furfurylidene) - 2 - thioxo-thiazolidine-4-one.

16. A therapeutically acceptable salt of the compound as claimed in claim 15.

References Cited

Chemical Abstracts I, vol. 55, col. 3547 (1961) (abstract of Zhelyazkov et al.).

Chemical Abstracts II, vol. 55, page 1808s (subject index) 1961.

Vasa et al., J. Indian Chem. Soc., vol. 36, pages 648 to 650 (1959).

Bhargava et al., J. Indian Chem. Soc., vol. 38, pages 23 to 26 (1961).

JOHN D. RANDOLPH, Primary Examiner

U.S. Cl. X.R.

424—273, 270